Figure 1:
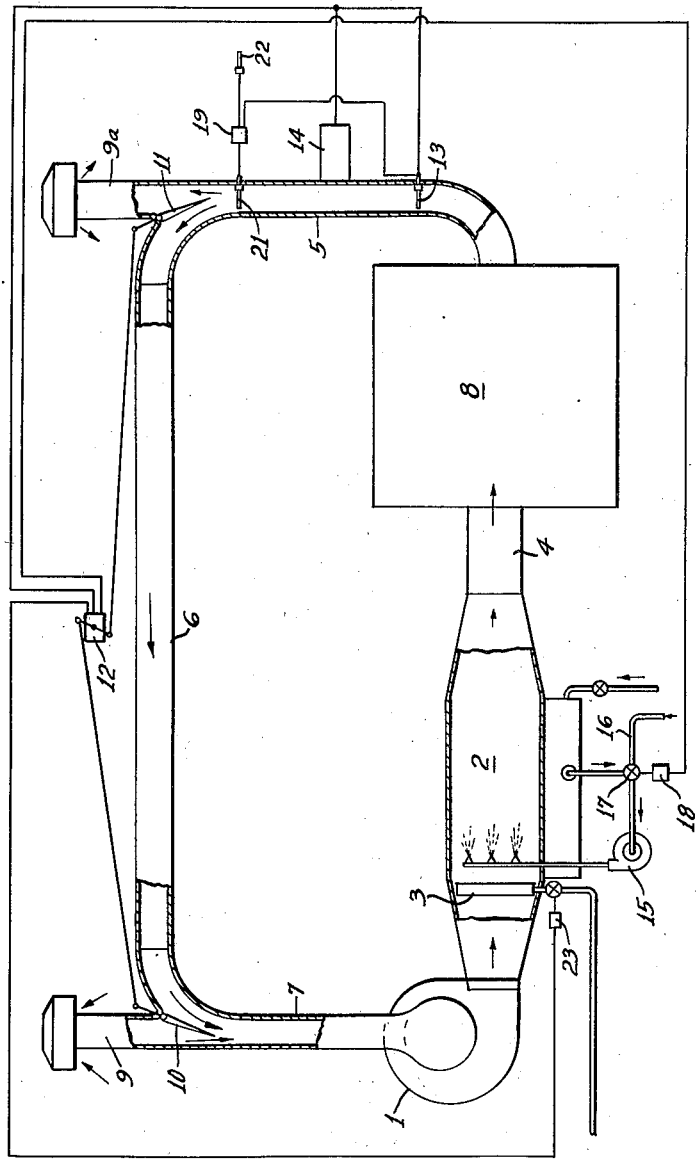

March 14, 1950 F. C. STEWART 2,500,775
APPARATUS FOR THE CONTROLLED GERMINATION
OF GRAIN DURING MALTING
Filed Sept. 3, 1948 2 Sheets-Sheet 1

INVENTOR
Frederick Charles Stewart
BY
Pennie, Edmonds, Morton and Barrows
ATTORNEYS Patented Mar. 14, 1950

2,500,775

UNITED STATES PATENT OFFICE 2,500,775

APPARATUS FOR THE CONTROLLED GERMINATION OF GRAIN DURING MALTING

Frederick Charles Stewart, Glasgow, Scotland, assignor of one-half to Robert Boby Limited, Bury St. Edwards, England, a British company Application September 3, 1948, Serial No. 47,606
In Great Britain July 23, 1947

1 Claim. (Cl. 257—3)

My invention relates to improvements in an apparatus or system for controlling the germination of grain during malting.

In the process of malting, the period of germination of the grain is one which requires very close control of temperature if the operation is to be expeditiously and efficiently carried out.

After the steeping process, the grain, in modern installations, is transferred to germinating drums, or saladin boxes, these items forming chambers which have provision for mixing the grain and are designed to permit the passage of conditioned air through the grain for the purpose, in the first place, of bringing the grain to a suitable germinating temperature as quickly as possible and, latterly for preventing the heat of germination when this commences from overheating the grain and affecting the quality thereby.

The present invention has for its object the provision of apparatus for the delivery and control of air to germinating drums, boxes, or other chambers in such a manner and of such quality with respect to temperature, humidity, and oxygen content as will ensure the optimum conditions for the germinating process.

In accordance with the features of my invention, my improved system or apparatus for controlling the germination of grain during malting, comprises a germinating chamber, a means providing a normally closed air circuit including said chamber, a fan, an air conditioner, and suitable ducting for returning air from the chamber to the fan. In this system the ducting is provided with an inlet for fresh air to the fan, an outlet for exhaust air from the germinating chamber, and interconnected inlet and exhaust valves. A servo-motor means is provided for operating these valves to admit fresh air into and to permit exhaust of air from the circuit as required, and a thermostatic means is disposed near the outlet of the germinating chamber for operating the servo-motor means. In addition to these controls the system includes a control device located near the outlet of the germinating chamber and responsive to changes in the proportion of carbon dioxide in the air in the apparatus. The carbon dioxide control device is arranged in the system so that it is adapted to override the functioning of the thermostatic means in the operation of the servo-motor when the rate of intake of fresh air is insufficient to maintain efficient germination, or to maintain a sufficiently low proportion of carbon dioxide in the system. A means is provided which is energized by the servo-motor means for admitting a cooling medium to the air conditioner, and a means is also provided which is energized by the servo-motor means for supplying heat to the air conditioner.

The apparatus described above, together with the control mechanism outlined, provides a fully automatic apparatus for the controlled germination of grain and eliminates entirely the personal element and the difficulties introduced by varying atmospheric conditions.

Figure 2:
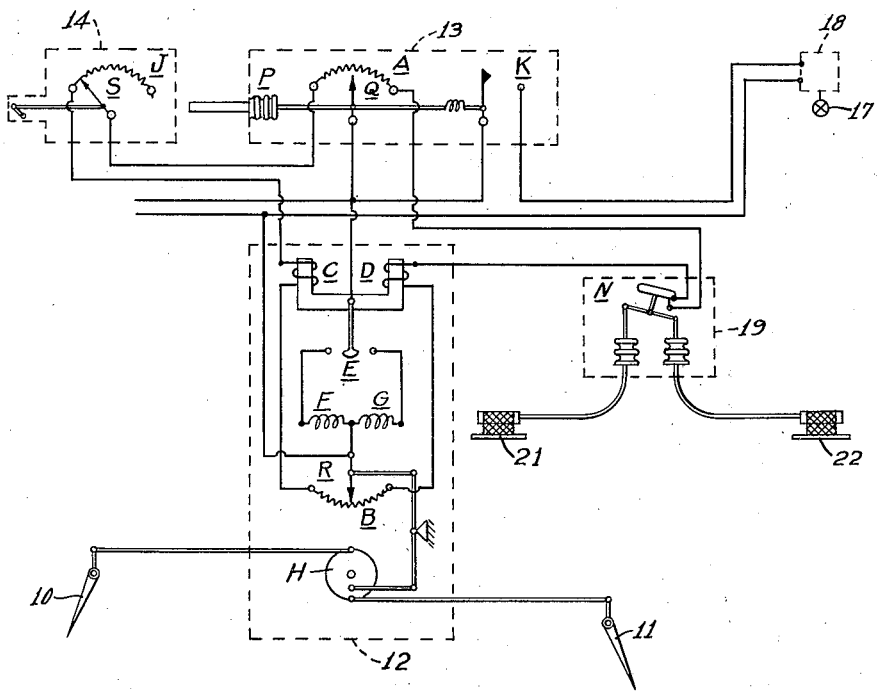

Apparatus for the controlled germination of grain during malting according to the invention is illustrated diagrammatically in Fig. 1 of the accompanying drawings. Fig. 2 is an electric circuit diagram of the thermostats and the $CO_2$ controller.

Referring to Fig. 1 of the drawings, I denotes an operating fan of centrifugal or axial flow type, driven by means not shown. 2 denotes an air conditioner of conventional or approved design.

Cooling means is applied to the water circuit in the air conditioner either by the injection of water of lower temperature than the spray water, or by a heat exchanger in the path of the spray water.

3 denotes a source of heat arranged in the air stream before the conditioner or, alternatively, in the spray water circuit.

4, 5, 6 and 7 denote a system of ducts by means of which the fan 1, the air conditioner 2, and a germinating drum or chamber 8 are connected in series, the air conditioner being preferably, but not necessarily, between the discharge of the fan and the germinating chamber. 6 is a recirculating duct arranged from the air outlet 5 of the germinating chamber back to the inlet 7 of the fan so that the fan, the air conditioner and the germinating chamber are in a closed air circulating circuit.

A fresh air duct 9 is connected to the fan inlet 7. An outlet 9a for exhaust air is fitted to the outlet 5 from the germinating chamber. Valves, 10, 11 are arranged at the respective junctions 6 and 7 and 6 and 5 and are so interlocked that, when the valve 10 is open to the outside atmosphere, the valve 11 is also open to the outside atmosphere, the recirculating air duct 6 being closed under this condition. The valves may be adjusted to any intermediate position up to the condition when all connection through either the fresh air duct or the exhaust air duct to the outside atmosphere is closed off, the system thereupon forming a closed circuit.

These valves are operated by a servo-motor 12 under the influence of a thermostat 13 of the modulating type placed in the outlet duct from the germinating chamber so that the amount of fresh air drawn into the system is increased as necessary to prevent the germinating temperature rising above the preferred level.

As during the process of germination the oxygen of the air is converted into carbon dioxide and the oxygen content therefore reduced, there is provided in the air circuit a carbon dioxide controller 14 which will override the action of the thermostat 13 should this latter, under the influence of a falling temperature, reduce the percentage of fresh air being drawn into the system below that necessary to maintain efficient germination.

The above operational procedure is satisfactory, while the outside or atmospheric wet bulb temperature is sufficiently below that of the optimum wet bulb temperature for germination as to ensure that the fresh air quantities passed through the grain will be capable of absorbing the germination heat without raising the temperature of the grain above the optimum temperature. When, however, the outside wet bulb temperature rises above this level, an alternative means of cooling is necessary.

I propose, therefore, to arrange a source of supply of chilled water from a refrigerating plant, deep well, or other appropriate source and introduce proportional quantities of this chilled water into the spray system of the air conditioner. One means of achieving this object, where the air conditioner has an individual spray pump 15, is to arrange a chilled water connection 16 to the inlet of the pump and by means of a two-way valve 17 proportion the quantity of chilled water introduced into the system so that the recirculated air will be cooled to the level necessary to maintain the required grain temperature.

For the control of this chilled water supply, there is arranged on the servo-motor 12 an electric switch which closes when the fresh air valve 10 is fully open to fresh air and directly, or through a relay, connects the thermostat to a servo-motor 18 on the valve 17 so that the additional cooling available from the chilled water will be impressed on the air passing through the air conditioner, thus maintaining the required germinating temperature.

Conditions may arise when the wet bulb temperature of the atmospheric air is in excess of the optimum grain temperature, in which case the admission of fresh air would increase the cooling load necessary for maintaining the required temperature, and it is proposed to introduce a differential thermostat 19, both bulbs of which will be of the wet bulb type, i. e., covered with a damp fabric, one 21 of these bulbs being located in the air duct 5 passing out of the germinating chamber and the other 22 in the outside air. The characteristic of this differential thermostat will be such that when the outside wet bulb temperature exceeds the germinating temperature, the thermostat mechanism will operate on the servo-motor 12, bringing this motor to the position where fresh air is shut off except in so far as this is demanded by the carbon dioxide controller 14.

The control between thermostats and servo-motors may be accomplished by the thermostat directly controlling the operation of the motor by electrical or pneutmatic means or through the medium of a relay where the power necessary for operating the controls is in excess of that capable of being provided by a thermostat mechanism.

Before germination has begun and under conditions when atmospheric temperatures are relatively low, circumstances may arise wherein germination cannot commence, or will be retarded, unless the general temperature of the grain is brought up to the appropriate level. To meet this contingency, heat is applied to the air circulating system. For the control of the application of this heat, it is proposed to arrange on the servo-motor 12 an electric switch which closes when the fresh air valve 10 is fully closed to fresh air and directly, or through a relay, connects a thermostat in the outlet duct from the chamber to a servo-motor 23 controlling the supply of the heating medium, or operating a contactor controlling the electric supply where electricity is used as the heating medium.

Means whereby the desired control may be obtained is illustrated in Fig. 2.

As shown, the servo motor 12 incorporates control gear including balancing coils C and D. Unbalanced current in one of these coils operates a changeover switch E to cause current to flow through a motor winding G or F, causing an actuating arm H to move in the appropriate direction. The arm H also operates through linkages an arm R of a potentiometer B. The circuit through the coil C is connected to one side of a potentiometer A in the thermostat 13 through a potentiometer J in the $CO_2$ controller 14, while the circuit through the coil D is connected to the other side of the potentiometer A in the thermostat 13 through the differential thermostat 19. The action of the temperature-sensitive element P in the thermostat 13 is such as to move the potentiometer arm Q across the potentiometer A. The potentiometer arms in the devices 12 and 13 are directly connected to the source of current, and current flows through the C coil circuit and the D coil circuit in accordance with the position of the arms Q and R. If the resistance in the C coil circuit is less than that in the D coil circuit, the changeover switch E will close the circuit through the motor coil F, causing the motor to actuate the arm H and the potentiometer arm R to move until the position of R in relation to that of Q is such that equal current flows through the coils C and D, and the switch E opens, and remains open until further movement of the arm Q under the influence of the temperature-sensitive element P disturbs the balance of current flowing through the coil circuits C and D. The movement is such that the valves 10 and 11 open to the atmosphere as the temperature rises, and if this latter should rise sufficiently to bring the potentiometer arm Q across the complete range of the potentiometer A, a switch K associated with the thermostat 13 closes and energises the motor 18 controlling the supply of the cooling water or other medium through the valve 17. When, through falling temperature, the arm Q moves to the other side of the potentiometer A, the valves 10 and 11 will close to atmosphere and, should the lack of oxygen cause a rise in $CO_2$ content in excess of requirements, the $CO_2$ controller will move the potentiometer arm S to introduce additional resistance in the C coil circuit, thereby causing the servo-motor to move from the position in which the valves 10 and 11 are fully closed to atmosphere to a position in which sufficient fresh air is introduced to maintain the required $CO_2$ content.

As already explained, the servo-motor 18 under the influence of the switch K opens the valve 17 when the potentiometer arm Q has reached the high limit of the temperature differential of control, and under this condition the valves 10 and 11 are fully open to atmospere. As it is extravagant to use fresh air where the fresh air heat content is in excess of the heat content of the air leaving the germination chamber, the differential thermostat 19 with its wet bulb element 22 in the atmosphere and the element 21 in the air leaving the germinating chamber operates in such wise that, when the wet bulb temperature is higher than the temperature of the element 21, the mercury switch N will be tilted so that the D coil circuit will be broken, thus causing the current in the C coil circuit to close the switch E and bring valves 10 and 11 to the position closed to atmosphere.

What is claimed is:

Apparatus for the controlled germination of grain during malting, comprising a normally closed air circuit including a fan, an air conditioner, a germinating chamber, and ducting for returning air from said chamber to said fan, said ducting having an inlet for fresh air to the fan and an outlet for exhaust air from the germinating chamber, interconnected inlet and exhaust valves incorporated in said ducting, servo-motor means for operating said valves to admit fresh air into and to permit exhaust of air from said circuit as required, thermostat means disposed near the outlet of said germinating chamber for operating said servo-motor means, a carbon dioxide controller also disposed near the outlet of said germinating chamber adapted to override the functioning of said thermostat means in operating said servo-motor means if the rate of intake of fresh air is insufficient to maintain efficient germination, means energized by said servo-motor means for admitting cooling medium to said air conditioner and means energized by said servo-motor means for supplying heat to said air conditioner.

FREDERICK CHARLES STEWART.

REFERENCES CITED

The following references are of record in the file of this patent:

UNITED STATES PATENTS

| Number    | Name     | Date          |
|-----------|----------|---------------|
| 1,751,805 | Fleisher | Mar. 25, 1930 |
| 2,004,927 | Bulkeley | June 18, 1935 |
| 2,209,263 | Gaines   | July 23, 1940 |